United States Patent
Nick et al.

(10) Patent No.: US 11,486,528 B2
(45) Date of Patent: Nov. 1, 2022

(54) QUICK-COUPLING WITH AUTOMATIC LOCKING MECHANISM

(71) Applicant: Parker-Hannifin Corporation, Cleveland, OH (US)

(72) Inventors: Leonard Nick, Rockford, MN (US); Jason Koller, Eden Prairie, MN (US); Timothy Marquis, Otsego, MN (US); Shawn Ellis, College Place, WA (US); Paul Lemay, Shoreview, MN (US)

(73) Assignee: Parker-Hannifin Corporation, Cleveland, OH (US)

( * ) Notice: Subject to any disclaimer, the term of this patent is extended or adjusted under 35 U.S.C. 154(b) by 154 days.

(21) Appl. No.: 17/087,888

(22) Filed: Nov. 3, 2020

(65) Prior Publication Data

US 2021/0148499 A1    May 20, 2021

Related U.S. Application Data

(60) Provisional application No. 62/935,682, filed on Nov. 15, 2019.

(51) Int. Cl.
*F16L 37/23* (2006.01)
*F16L 37/34* (2006.01)

(52) U.S. Cl.
CPC ............... *F16L 37/23* (2013.01); *F16L 37/34* (2013.01)

(58) Field of Classification Search
CPC ............ F16L 37/23; F16L 37/22; F16L 37/34
See application file for complete search history.

(56) References Cited

U.S. PATENT DOCUMENTS

| 2,708,589 | A | * | 5/1955 | Masek | F16L 37/23 |
| | | | | | 251/149.6 |
| 3,073,342 | A | * | 1/1963 | Magorien | F16L 37/34 |
| | | | | | 137/614.03 |

(Continued)

FOREIGN PATENT DOCUMENTS

| DE | 102009035380 A1 * | 2/2011 | ............. F16L 37/23 |
| EP | 0886742 | 12/1998 | |

(Continued)

OTHER PUBLICATIONS

"Pneumatic Quick Couplings—General Purpose;" 30 Series Catalog 3800 Section A; Parker-Hannifin Corporation Quick Coupling Division; pp. A11-A13.

(Continued)

*Primary Examiner* — David Colon-Morales
(74) *Attorney, Agent, or Firm* — Renner, Otto, Boisselle & Sklar, LLP (57) ABSTRACT

An enhanced quick coupling configuration has a push-to-connect locking mechanism in which holding the outer sleeve does not affect the ability to connect the coupling, and the outer sleeve otherwise does not need to be restrained by additional components. The coupling includes a single sleeve spring in the locking mechanism, and the use of smaller restriction slots to house axially offset locking balls in a manner that axially constrains movement of the locking balls. When a male component is inserted into the female component during a connection operation, a shoulder on the male component sequentially contacts the axially offset rows of locking balls, which drive the inner sleeve axially in an inward direction. In the fully connected state, the inner sleeve is biased axially outward so as to push back against the inward locking balls, thereby preventing further movement of the inward locking balls.

14 Claims, 4 Drawing Sheets

(56) References Cited

U.S. PATENT DOCUMENTS

| | | | | |
|---|---|---|---|---|
| 3,112,767 A | * | 12/1963 | Cator | F16L 37/23 285/277 |
| 4,114,853 A | | 9/1978 | Medvick | |
| 5,240,023 A | * | 8/1993 | Shelef | F16L 37/38 251/149.6 |
| 5,323,812 A | * | 6/1994 | Wayne | F16L 37/35 285/306 |
| 5,445,358 A | * | 8/1995 | Anderson | F16L 37/38 251/149.6 |
| 5,709,243 A | * | 1/1998 | Wells | F16L 37/34 137/614.01 |
| 6,089,539 A | | 7/2000 | Kouda | |
| 6,279,874 B1 | * | 8/2001 | Nyberg | F16L 37/121 251/149.6 |
| 6,328,348 B1 | * | 12/2001 | Cornford | F16L 37/34 285/305 |
| 6,371,443 B1 | * | 4/2002 | Imai | F16L 37/35 137/614.04 |
| 6,779,778 B2 | * | 8/2004 | Kuwabara | F16L 37/46 285/86 |
| 7,452,006 B2 | | 11/2008 | Kohda | |
| 7,661,725 B2 | * | 2/2010 | Kouda | F16L 37/23 285/318 |
| 8,205,914 B2 | | 6/2012 | Chappaz et al. | |
| 8,256,803 B2 | * | 9/2012 | Takahashi | F16L 37/34 285/86 |
| 8,469,406 B2 | * | 6/2013 | Takahashi | F16L 37/34 137/614.05 |
| 8,628,119 B2 | * | 1/2014 | Hasunuma | F16L 37/34 285/276 |
| 8,973,896 B2 | * | 3/2015 | Tiberghien | F16L 37/23 137/614.04 |
| 9,631,749 B2 | | 4/2017 | Wen | |
| 9,909,703 B2 | | 3/2018 | Van Scyoc | |
| 2016/0047503 A1 | * | 2/2016 | Ballard | B67D 7/344 251/149.7 |
| 2020/0363000 A1 | * | 11/2020 | Tiberghien | F16L 37/34 |

FOREIGN PATENT DOCUMENTS

| | | | | |
|---|---|---|---|---|
| EP | 2103859 A1 | * | 9/2009 | F16L 37/23 |
| EP | 3377798 | | 9/2018 | |
| EP | 3739253 A1 | * | 11/2020 | F16L 37/22 |
| GB | 2435913 | | 9/2007 | |
| GB | 2435913 A | * | 9/2007 | F16L 37/23 |
| SE | 465793 B | * | 10/1991 | F16L 37/23 |
| WO | 97/35143 | | 9/1997 | |
| WO | 2017/085130 | | 5/2017 | |

OTHER PUBLICATIONS

Extended European Search Report issued by EUIPO for corresponding European Patent Application No. 20205922.6 dated Mar. 22, 2021.

* cited by examiner

QUICK-COUPLING WITH AUTOMATIC LOCKING MECHANISM

RELATED APPLICATIONS

This application claims the benefit of U.S. Provisional Application No. 62/935,682 filed Nov. 15, 2019, the contents of which are incorporated herein by reference.

FIELD OF INVENTION

The present invention relates generally to quick couplings that provide a push-to-connect locking mechanism in a fluid system.

BACKGROUND OF THE INVENTION

Quick couplings that provide a push-to-connect locking mechanism have a variety of applications that require the passage of fluid between components of a fluid system. Push-to-connect quick couplings, as the term suggests, connect two components of a fluid system by pushing a male component relative to a female component, wherein the two components then remain connected by a suitable locking mechanism. Typical locking mechanisms employ ball bearings or other suitable locking members that are seated within a locking slot to preclude the components from pulling apart during use. During connection and disconnection operations, the locking balls can move laterally from the locking slot to permit passage of the male component relative to the female component for such connection and disconnection.

Push-to-connect quick couplings are desirable for certain fluid applications for their relative ease of use, as no special tools are required for connection and disconnection. Conventional push-to-connect configurations, however, still have deficiencies with respect to connection and disconnection. In particular, some conventional configurations employ an outer sleeve that can undesirably move during connection in a manner that can interfere with the connection operation (rather, the sleeve is moved to perform disconnection), which means the outer sleeve cannot be held by the user during the connection operation. For small couplings and/or couplings employed in tight spaces, the result may be a deficient gripping surface to perform the push-to-connect operation. In alternative configurations, the outer sleeve may be held in place during connection by an alternative component, such as locking pins housed in specially shaped locking slots, and thus such configurations require complex geometries of the components.

Relatedly, conventional configurations typically require an "overtravel" insertion during connection for proper positioning of the locking balls during the connection operation, whereby the male component is inserted into the female component beyond the functioning connected state, with the locking mechanism returning from the overtravel state under a spring bias. The use of an overtravel operation also restricts the internal geometries of the locking features, for example requiring elongated axial slots for axial movement of the locking balls, and additional modifications in the spring configuration, further resulting in a complex arrangement of components. Conventional push-to-connect quick couplings, therefore, remain deficient as to the ease of operation and/or simplicity of construction.

SUMMARY OF THE INVENTION

Embodiments of the present application provide for an enhanced quick coupling configuration having a push-to-connect locking mechanism in which holding the outer sleeve does not affect the ability to connect the coupling, and the outer sleeve otherwise does not need to be restrained by additional components. The locking mechanism also does not require the coupling components to overtravel during connection. Such advantages are accomplished using a reduction of design complexity over conventional configurations in the use of a single sleeve spring in the locking mechanism, and the use of smaller restrictive slots to house the locking ball bearings in a manner that axially constrains movement of the locking balls.

The quick coupling includes a female component having a body that defines a fluid passage and houses two axially offset rows of locking members, for example ball bearings that act as locking balls. The female component further includes an inner sleeve and an outer sleeve in the lateral direction that are operable to perform connection and disconnection operations. When a male component is inserted into the female component during a connection operation, a shoulder on the male component first contacts an axially outward row of locking balls, which begin to drive the inner sleeve axially in an inward direction. The outward locking balls are driven laterally outward by the shoulder into an outward restriction slot, wherein the outward restriction slot precludes axial movement of the outward row of locking balls.

As the male component is inserted further into the female component during the connection operation, the shoulder on the male component next contacts an axially inward row of locking balls, which further drive the inner sleeve axially in an inward direction. The inward locking balls also are driven laterally outward into an axially inward restriction slot, wherein the inward restriction slot precludes axial movement of the inward row of locking balls. With the rows of locking balls positioned in the restriction slots, the inner sleeve is driven sufficiently inward to permit the male component to be inserted further into the female component to achieve a connected state, without the need for overtravel, in which fluid can pass between the two components. In the fully connected state, the inner sleeve is biased axially outward to so as to push back against the inward locking balls, thereby preventing further movement of the inward locking balls. In such state, the locking balls prevent separation of the male and female components. During the connection operation, movement of the outer sleeve is inconsequential to the efficacy of the connection operation, and thus a user can hold the outer sleeve as desired to enhance the gripping of the female component for the push-to-connect operation.

During a disconnection operation, the outer sleeve is pulled in an axial direction away from the locking balls, which in turns drives the inner sleeve away from the locking balls. This permits the locking balls to move back into the restriction slots so as to permit removal of the male component from the female component.

An aspect of the invention, therefore, is a coupler assembly having an enhanced push-to-connect configuration employing a simplified design as compared to conventional configurations. In exemplary embodiments, the coupler assembly includes a first coupler component that is inserted into a second coupler component for a push-to connect connection operation. The second coupler component includes a body that defines a first restriction slot and a second restriction slot that is axially offset relative to the first restriction slot; and a first locking member positioned in the first restriction slot and a second locking member positioned within the second restriction slot such that the second locking member is axially offset relative to the first locking member. The first locking member is laterally movable within the first restriction slot and the first restriction slot essentially precludes axial movement of the first locking member within the first restriction slot, and the second locking member is laterally movable within the second restriction slot and the second restriction slot essentially precludes axial movement of the second locking member within the second restriction slot.

The coupler assembly further includes an inner sleeve positioned laterally outward relative to the first and second locking members, and the inner sleeve is axially moveable along a portion of the body between a first inner sleeve position and a second inner sleeve position; a sleeve biasing member that biases the inner sleeve toward the first inner sleeve position; and an outer sleeve positioned laterally outward relative to the inner sleeve, and the outer sleeve is axially movable along the body between a first outer sleeve position and a second outer sleeve position. The inner sleeve and the outer sleeve interact against each other at a driving interface such that the sleeve biasing member biasing the inner sleeve further biases the outer sleeve toward the first outer sleeve position, and movement of the outer sleeve from the first outer sleeve position toward the second outer sleeve position moves the inner sleeve from the first inner sleeve position toward the second inner sleeve position.

The first coupler component includes a shoulder located on an outer surface of the first component body, and during a connection operation, the shoulder firstly contacts the first locking member and drives the first locking member laterally outward within the first restriction slot. The inner sleeve includes a sloped driving surface, and lateral outward movement of the first locking member interacts against the sloped driving surface to drive the inner sleeve axially from the first inner sleeve position toward the second inner sleeve position. During the connection operation, the shoulder secondly contacts the second locking member and drives the second locking member laterally outward within the second restriction slot, which drives the inner sleeve further toward the second inner sleeve position. The first component body defines a locking slot that is located axially outward relative to the shoulder, and in a fully connected state the second locking member is positioned within the locking slot to prevent separation of the first and second coupler components with the sleeve biasing member maintaining the inner sleeve in the first inner sleeve position to maintain the second locking member within the locking slot to prevent separation of the first and second coupler components. In a disconnection operation, the outer sleeve is moved axially away from the second locking member, and the outer sleeve drives the inner sleeve away from the second locking member via the driving interface.

These and further features of the present invention will be apparent with reference to the following description and attached drawings. In the description and drawings, particular embodiments of the invention have been disclosed in detail as being indicative of some of the ways in which the principles of the invention may be employed, but it is understood that the invention is not limited correspondingly in scope. Rather, the invention includes all changes, modifications and equivalents coming within the spirit and terms of the claims appended hereto. Features that are described and/or illustrated with respect to one embodiment may be used in the same way or in a similar way in one or more other embodiments and/or in combination with or instead of the features of the other embodiments.

DETAILED DESCRIPTION

Embodiments of the present application will now be described with reference to the drawings, wherein like reference numerals are used to refer to like elements throughout. It will be understood that the figures are not necessarily to scale.

Embodiments of the present application provide for an enhanced quick coupling configuration having a push-to-connect locking mechanism in which holding the outer sleeve does not affect the ability to connect the coupling, and the outer sleeve otherwise does not need to be restrained by additional components. The locking mechanism also does not require the coupling components to overtravel during connection. Such advantages are accomplished using a reduction of design complexity over conventional configurations in the use of a single sleeve spring in the locking mechanism, and the use of smaller restrictive slots to house the locking ball bearings in a manner that axially constrains movement of the locking balls while permitting lateral movement within the restrictive slots.

Figure 1:
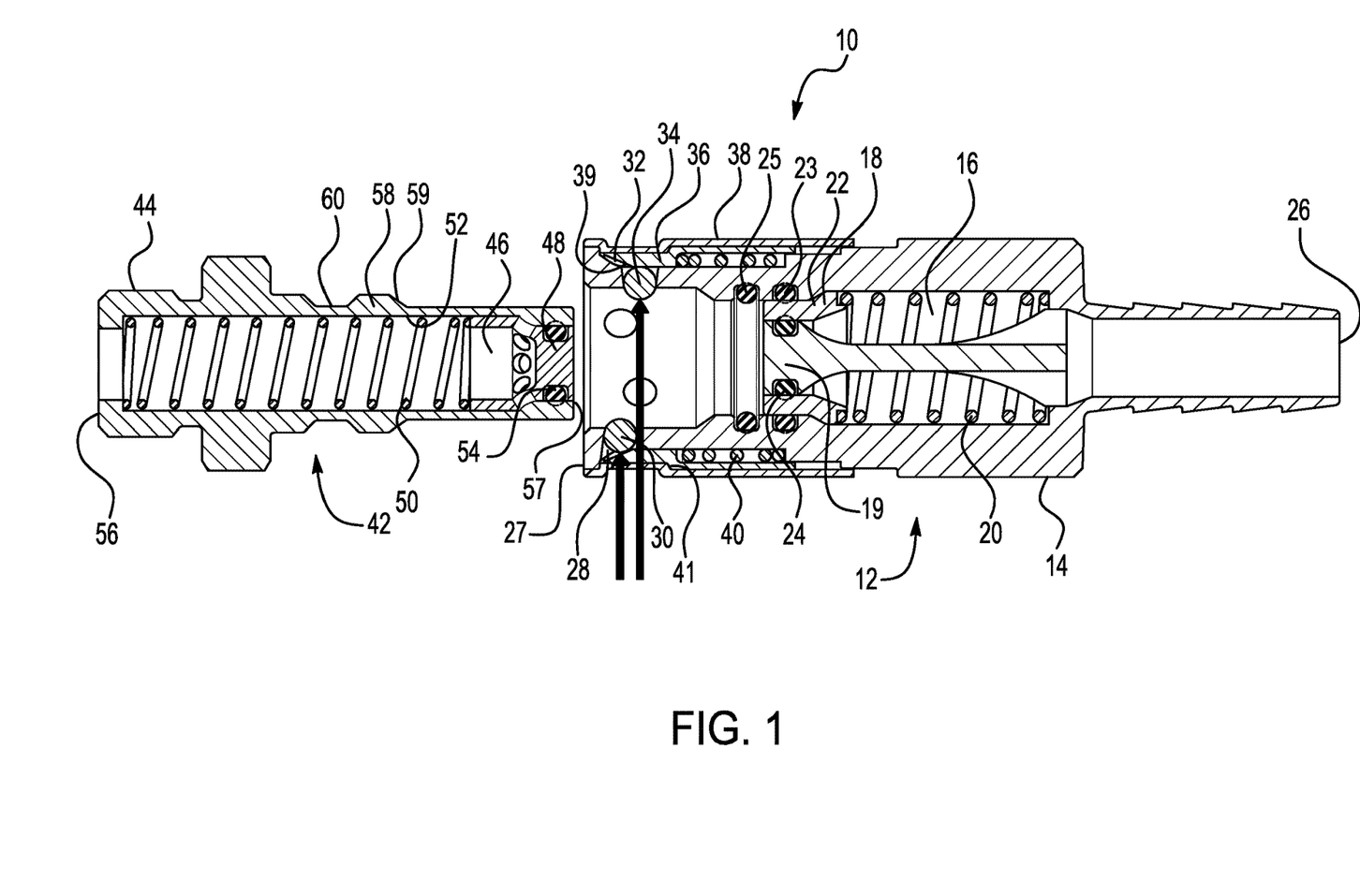
FIG. 1 is a drawing depicting a side cross-sectional view of an exemplary coupler assembly in accordance with embodiments of the present application, with the coupler assembly being in a disconnected state.

FIG. 1 is a drawing depicting a side cross-sectional view of an exemplary coupler assembly 10 in accordance with embodiments of the present application, with the coupler assembly 10 being in a disconnected state. The coupler assembly 10 includes a female component 12 having a female body 14 that defines a fluid passage 16. The female component includes a female-side poppet 18 having a plunger 19 that is biased by a female-side spring 20 toward a closed position. In the disconnected state shown in FIG. 1, therefore, the poppet 18 is biased against an inner surface 22 of the female body 14. The interface of the poppet and body is sealed using a first O-ring seal 23, and an outer surface of the plunger 19 is sealed against an inner surface of the poppet 18 by using a second O-ring seal 24. The female component 12 further includes a first end 26 that is connectable to a fluid system component. For example, the first end 26 is illustrated as being barbed for connection to a hose or like component, although other configurations of the first end may be employed for connection to any suitable fluid system component. The female component 12 further includes a second end 27 opposite from the first end 26, the second end 27 being connectable to a male component of the coupler assembly as further detailed below.

For purposes of explanation, as used herein the axial direction corresponds to a longitudinal direction, i.e., a direction along the fluid passage 16 that corresponds to the direction of fluid through the coupler assembly. The lateral direction corresponds to a direction perpendicular to the axial direction and corresponding to the vertical direction in the figures. In addition, a direction toward the first end 26 of the female component 12 is denoted as the axially inward direction, and a direction toward the second end 27 of the female component 12 is denoted as the axially outward direction.

The female body 14 of the female component 12 houses two axially offset rows of locking members, for example ball bearings that act as locking balls. Although locking balls are illustrated in the figures as a representative embodiment, other suitable configurations of locking members may be employed, such as for example locking pins, wedges, or the like. The female body 14 in particular defines a first restriction slot 28 that houses a first or axially outward row of locking balls 30. The female body 14 further defines a second restriction slot 32 that houses a second or axially inward row of locking balls 34. Accordingly, the outward row and inward row of locking balls within their respective restriction slots are offset from each other in the axial direction, as indicated by the arrows in FIG. 1. In addition, each row of locking balls is positioned within the respective restriction slot in a tight fit in the axial direction, whereby the restriction slots essentially preclude axial movement of the locking balls within the restriction slots.

The female component 12 further includes an inner sleeve 36 and an outer sleeve 38 in the lateral direction that are operable to perform connection and disconnection operations as further detailed below. The inner sleeve 36 is movable in the axial direction along a portion of the outer surface of the female body 14 between a first or outward inner sleeve position and a second or inward inner sleeve position.

The inner sleeve 36 is biased in the toward the first/outward inner sleeve position by a sleeve biasing member 40, which in exemplary embodiments is configured as a spring. The outer sleeve 38 is similarly axially movable along a portion of the outer surface of the female body 14 between a first or outward outer sleeve position and a second or inward outer sleeve position. The inner and outer sleeves interact against each other at a driving interface 41. Accordingly, due to the interaction of the sleeves at the driving interface 41, the sleeve spring 40 also operates via the driving interface 41 to bias the outer sleeve 38 in the first/outward outer sleeve position. As FIG. 1 depicts the disconnected state of the coupler assembly 10, both the inner and outer sleeves are in their respective outward sleeve positions by operation of the bias of the sleeve spring 40. The described configuration provides a simpler design as compared to conventional configurations, in that a single sleeve spring 40 operates to bias both the inner and outer sleeves toward the axially outward position.

The coupler assembly 10 further includes a male component 42 having a male body 44 that defines a fluid passage 46. The male component 42 includes a male-side poppet 48 that is biased by a male-side spring 50 toward a closed position. In the disconnected state shown in FIG. 1, therefore, the poppet 48 is biased against an inner surface 52 of the male body 44, and the interface of the poppet and body is sealed using another O-ring seal 54. The male component 42 further includes a first end 56 that is connectable to a fluid system component. For example, the first end 56 is illustrated as being a fitting for connection to a pipe section or like component, although other configurations of the first end may be employed for connection to any suitable fluid system component. The male component 42 further includes a second end 57 opposite from the first end 56, the second end 57 being connectable to the female component 12 of the coupler assembly as further detailed below. The male component 42 further includes a shoulder 58, and an outer surface of the male component 42 defines a locking slot 60 that is positioned in the outward axial direction relative to the shoulder 58.

As referenced above, FIG. 1 depicts the coupler assembly 10 with the female component 12 and male component 42 in the disconnected state. FIGS. 2-5 depict a progression of positions of the coupler assembly 10 corresponding to a connection operation.

Figure 2:
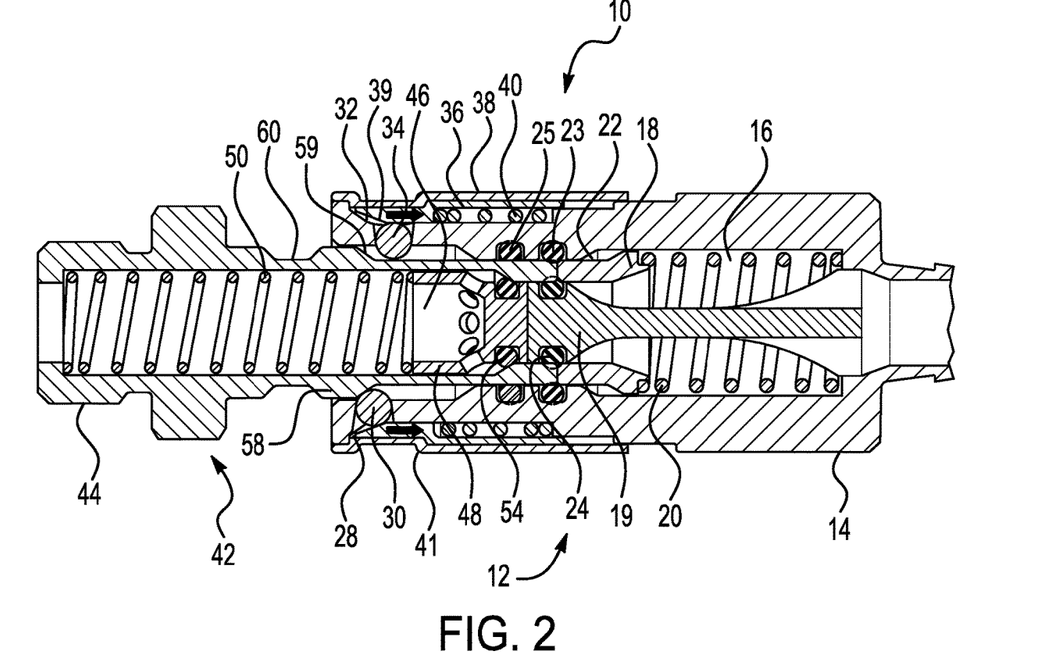
FIG. 2 is a drawing depicting the exemplary coupler assembly of FIG. 1, in a first position during a connection operation.

FIG. 2, therefore, is a drawing depicting the coupler assembly 10 in a first position during the connection operation. When the male component 42 is first inserted into the female component 12 during the connection operation, the male component reaches the first position shown in FIG. 2 in which the male body 44 begins driving the female poppet 18 back against the bias of the female-side spring 20. The male poppet 48 contacts the plunger 19 of the female component, although at this position the coupler assembly remains closed to fluid flow by the O-ring seal 24 sealing between the plunger 19 and an inner surface of the male body 44. An outer surface of the male body 44 is sealed relative to an inner surface of the female body 14 by a third O-ring seal 25 in addition to the O-ring seals 23 and 24.

In the first position of FIG. 2, the shoulder 58 on the male component 42 first contacts the axially outward row of locking balls 30. As referenced above, the restriction slot 28 essentially precludes axial movement of the locking balls 30. However, lateral movement of the locking balls 30 is permitted within the restriction slot 28. The shoulder 58 includes a sloped surface 59, and due to such sloped configuration, the shoulder 58 drives the locking balls 30 laterally outward within the restriction slot 28. In addition, the inner sleeve 36 has a driving surface 39 that also is sloped, and thus the lateral outward movement of the outward locking balls 30 begins to drive the inner sleeve 36 axially in an inward direction against the bias of the sleeve spring 40, as indicated by the arrows in FIG. 2.

Figure 3:
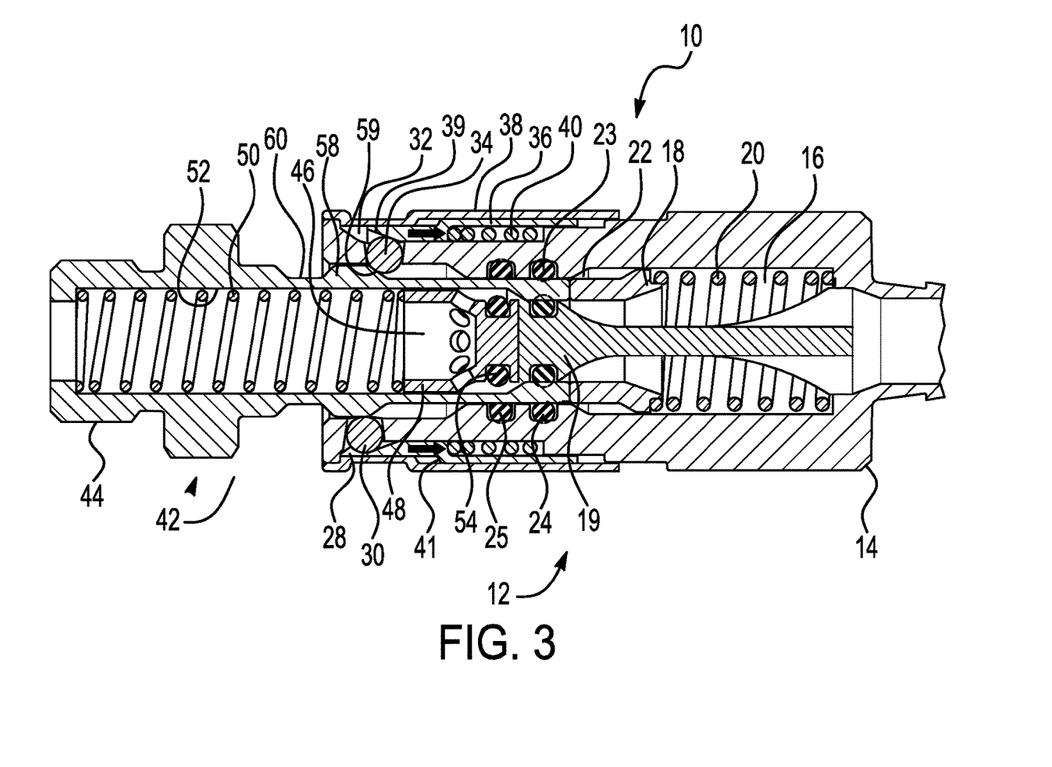
FIG. 3 is a drawing depicting the exemplary coupler assembly of FIG. 1, in a second position during a connection operation.

FIG. 3 is a drawing depicting the coupler assembly 10 in a second position during the connection operation. As the male component 42 is inserted further into the female component 12 during the connection operation, the male body 44 continues driving the female poppet 18 back against the bias of the female-side spring 20. The male poppet 48 remains in contact with the plunger 19 of the female component, although at this position the coupler assembly still remains closed to fluid flow by the O-ring seal 24 sealing between the plunger 19 and an inner surface of the male body 44. In addition, at the second position of FIG. 3, the shoulder 58 on the male component 42 next contacts the axially inward row of locking balls 34. As referenced above, the restriction slot 32 essentially precludes axial movement of the locking balls 34. Accordingly, the sloped surface 59 of the shoulder 58 now drives the locking balls 34 laterally outward within the second restriction slot 32. Because as referenced above the inner sleeve 36 has the driving surface 39 that also is sloped, the lateral outward movement of the inward locking balls 34 further drives inner sleeve 36 axially inward against the bias of the sleeve spring 40, as indicated by the arrows in FIG. 3.

Figure 4:
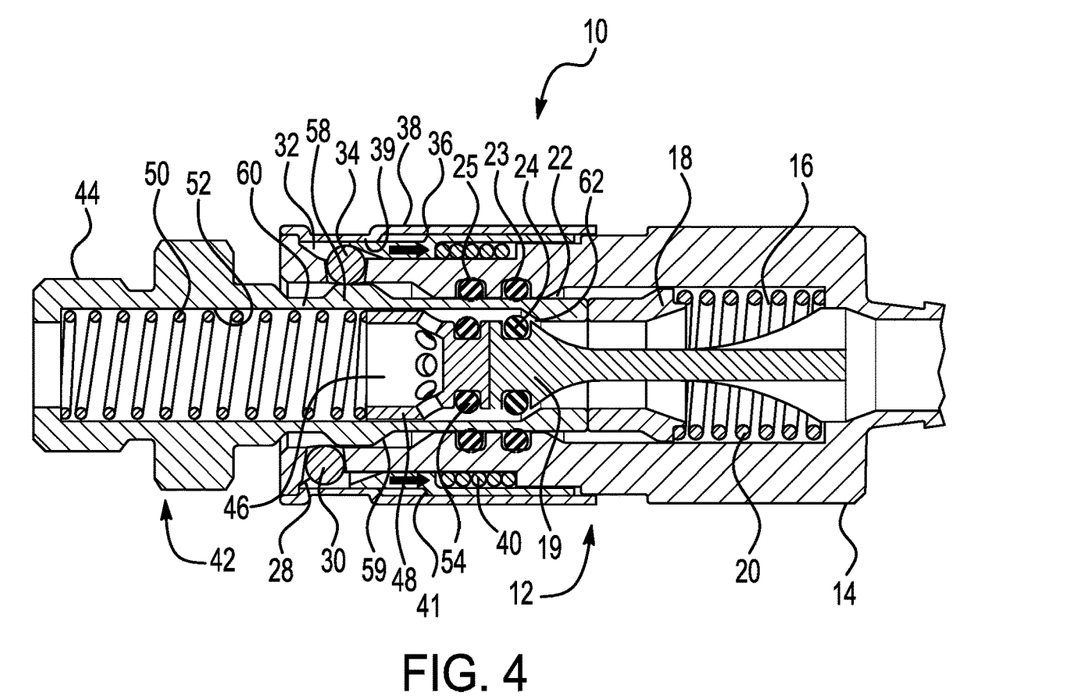
FIG. 4 is a drawing depicting the exemplary coupler assembly of FIG. 1, in a third position during a connection operation.

FIG. 4 is a drawing depicting the coupler assembly 10 in a third position during the connection operation. Continuing as described above, as the male component 42 is inserted further into the female component 12 during the connection operation, the male body 44 continues driving the female poppet 18 back against the bias of the female-side spring 20. At this stage with the spring 20 being highly compressed, the plunger 19 begins to exert a reactionary outward forced on the male poppet 48 and against the bias of the male-side spring 50. The interaction of the plunger 19 and poppet 48 begins to move from the O-ring seal 24 off from the inner surface of the male body 44, and this begins to open a flow passage 62 that will permit fluid flow through the coupler assembly. In the position of FIG. 4, both rows of locking balls 30 and 34 have been driven maximally laterally outward within the respective restriction slots 28 and 32. With the rows of locking balls positioned laterally outward in the restriction slots, the inner sleeve 36 has been driven sufficiently inward to permit the male component to be inserted further into the female component to achieve a connected state in which fluid can pass between the two coupler components 12 (female) and 42 (male).

Figure 5:
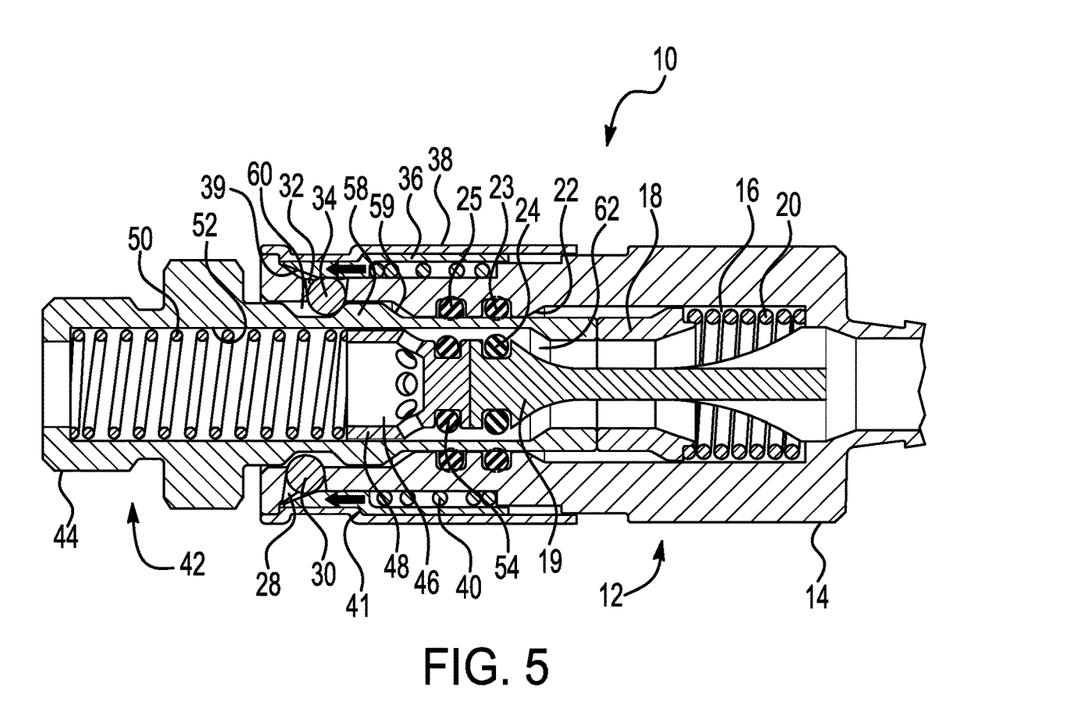
FIG. 5 is a drawing depicting the exemplary coupler assembly of FIG. 1, in a fully connected state in which fluid may flow through the coupler assembly.

Accordingly, FIG. 5 is a drawing depicting the coupler assembly 10 in a fully connected state in which fluid may flow through the coupler assembly through the flow passage 62. In such fully connected state, the inner sleeve 36 is biased axially outward by the sleeve spring 40 so as to push back against the inward locking balls 34. In addition, the male component 42 is inserted into the female component 12 to a position at which at least the inward locking balls 34 are positioned at least partially within the locking slot 60 that is defined in the laterally outer surface of the male component 42. By action of the axially outward bias of the inner sleeve 36, the locking balls 34 are driven into the locking slot 60, thereby preventing further movement of the inward locking balls. In such state, the locking balls prevent separation of the male and female components.

During the connection operation described above, movement of the outer sleeve 38 is inconsequential to the efficacy of the connection operation, and thus a user can hold the outer sleeve as desired to enhance the gripping of the female component for the connection operation. The configuration of the coupler assembly 10, therefore, has advantages over conventional configurations in that the connection operation is easier to perform, and therefore is particularly suitable for smaller couplers and couplers in tight spaces as compared to conventional configurations. The configuration of FIGS. 1-5 also employs a simpler design as compared to configurations, using only the single sleeve spring 40 as part of the locking mechanism. Overtravel also is not performed, and thus the restrictions slots 28 and 32 can be made smaller and configured with a tight fit that essentially precludes axial movement of the rows of locking balls 30 and 34.

Figure 6:
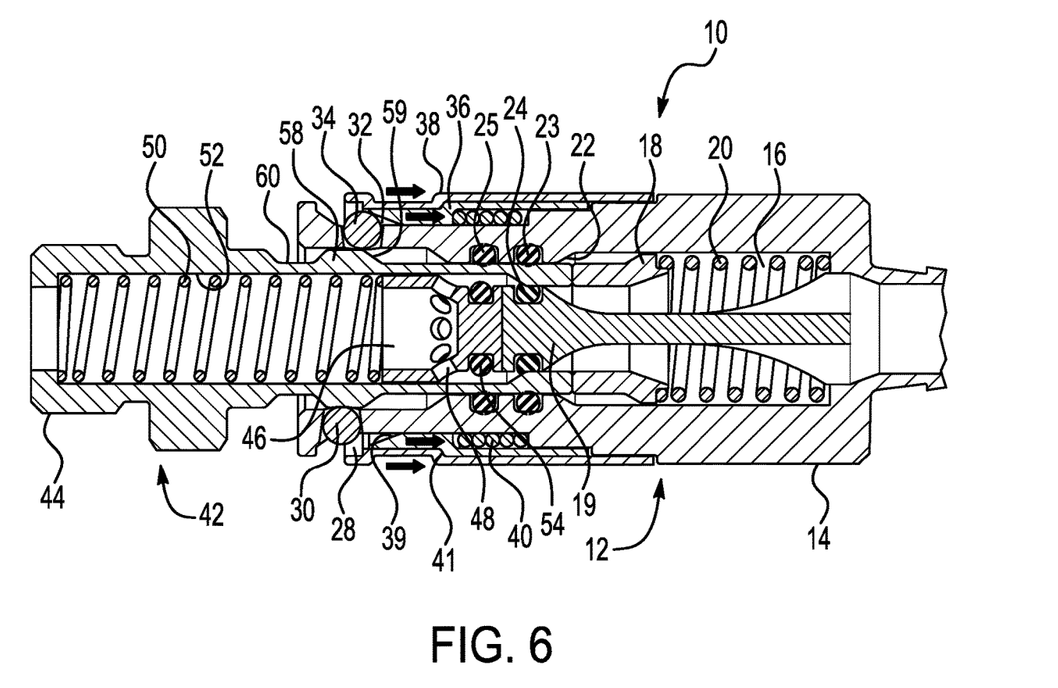
FIG. 6 is a drawing depicting the exemplary coupler assembly of FIG. 1, and illustrating a disconnection operation.

FIG. 6 is a drawing depicting the exemplary coupler assembly 10 and illustrating a disconnection operation. During the disconnection operation, the outer sleeve 38 is pulled by the user in an axial direction away from the locking balls 30 and 34. Because of the driving interface 41 of the inner sleeve 36 and outer sleeve 38, such movement of the outer sleeve 38 in turn drives the inner sleeve 36 away from the locking balls 30 and 34 and against the bias of the sleeve spring 40, as shown by the arrows in FIG. 6. This permits the locking balls to move back into the respective restriction slots 28 and 32 so as to permit removal of the male component 42 from the female component 12. Once the male component 42 is fully removed from the female component 12, under the bias of the springs 20, 40, and 50, the male and female components revert back to the disconnected state as illustrated in FIG. 1.

An aspect of the invention, therefore, is a coupler assembly having an enhanced push-to-connect configuration employing a simplified design as compared to conventional configurations. In exemplary embodiments, the coupler assembly includes a first coupler component that is inserted into a second coupler component. The second coupler component includes a body that defines a first restriction slot and a second restriction slot that is axially offset relative to the first restriction slot; a first locking member positioned in the first restriction slot and a second locking member positioned within the second restriction slot such that the second locking member is axially offset relative to the first locking member; wherein the first locking member is laterally movable within the first restriction slot and the first restriction slot essentially precludes axial movement of the first locking member within the first restriction slot, and the second locking member is laterally movable within the second restriction slot and the second restriction slot essentially precludes axial movement of the second locking member within the second restriction slot; an inner sleeve positioned laterally outward relative to the first and second locking members, and the inner sleeve is axially moveable along a portion of the body between a first inner sleeve position and a second inner sleeve position; a sleeve biasing member that biases the inner sleeve toward the first inner sleeve position; and an outer sleeve positioned laterally outward relative to the inner sleeve, and the outer sleeve is axially movable along the body between a first outer sleeve position and a second outer sleeve position; wherein the inner sleeve and the outer sleeve interact against each other at a driving interface such that the sleeve biasing member biasing the inner sleeve further biases the outer sleeve toward the first outer sleeve position, and movement of the outer sleeve from the first outer sleeve position toward the second outer sleeve position moves the inner sleeve from the first inner sleeve position toward the second inner sleeve position. The coupler assembly may include one or more of the following features, either individually or in combination.

In an exemplary embodiment of the coupler assembly, the first coupler component comprises a first component body that includes a shoulder located on an outer surface of the first component body, and during a connection operation to connect the first and second coupler components, the shoulder firstly contacts the first locking member and drives the first locking member laterally outward within the first restriction slot.

In an exemplary embodiment of the coupler assembly, the inner sleeve includes a sloped driving surface, and lateral outward movement of the first locking member interacts against the sloped driving surface to drive the inner sleeve axially from the first inner sleeve position toward the second inner sleeve position.

In an exemplary embodiment of the coupler assembly, during the connection operation, the shoulder secondly contacts the second locking member and drives the second locking member laterally outward within the second restriction slot.

In an exemplary embodiment of the coupler assembly, the lateral outward movement of the second locking member interacts against the sloped driving surface of the inner sleeve to drive the inner sleeve further toward the second inner sleeve position.

In an exemplary embodiment of the coupler assembly, the first component body defines a locking slot that is located axially outward relative to the shoulder, and in a fully connected state of the first and second coupler components, the second locking member is positioned within the locking slot to prevent separation of the first and second coupler components.

In an exemplary embodiment of the coupler assembly, in the fully connected state, the sleeve biasing member maintains the inner sleeve in the first inner sleeve position to maintain the second locking member within the locking slot to prevent separation of the first and second coupler components.

In an exemplary embodiment of the coupler assembly, the outer sleeve is configured such that movement of the outer sleeve during the connection operation does not affect connecting the first and second coupler components.

In an exemplary embodiment of the coupler assembly, in a disconnection operation, the outer sleeve is moved axially away from the second locking member, and the outer sleeve drives the inner sleeve away from the second locking member via the driving interface.

In an exemplary embodiment of the coupler assembly, the inner sleeve biasing member is a spring.

In an exemplary embodiment of the coupler assembly, each of the first locking member and the second locking member comprises a row of locking balls.

In an exemplary embodiment of the coupler assembly, the first coupler component is a male component and the second coupler component is a female component.

In an exemplary embodiment of the coupler assembly, the female component includes a female-side spring that biases a female-side poppet toward a closed position, and the male component includes a male-side spring that biases a male-side poppet toward a closed position; and wherein during a connection operation to connect the male component and the female component, the female-side poppet interacts against an inner surface of the male component.

In an exemplary embodiment of the coupler assembly, the female-side poppet includes a plunger, and during the connection operation to connect the male component and the female component, the male-side poppet interacts against the plunger to open a fluid passage through the coupler assembly.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A coupler assembly comprising:
   a first coupler component that is inserted into a second coupler component;
   the second coupler component comprising:
   a body that defines a first restriction slot and a second restriction slot that is axially offset relative to the first restriction slot;
   a first locking member positioned in the first restriction slot and a second locking member positioned within the second restriction slot such that the second locking member is axially offset relative to the first locking member;
   wherein the first locking member is laterally movable within the first restriction slot and the first restriction slot essentially precludes axial movement of the first locking member within the first restriction slot, and the second locking member is laterally movable within the second restriction slot and the second restriction slot essentially precludes axial movement of the second locking member within the second restriction slot;
   an inner sleeve positioned laterally outward relative to the first and second locking members, and the inner sleeve is axially moveable along a portion of the body between a first inner sleeve position and a second inner sleeve position;
   a sleeve biasing member that biases the inner sleeve toward the first inner sleeve position; and
   an outer sleeve positioned laterally outward relative to the inner sleeve, and the outer sleeve is axially movable along the body between a first outer sleeve position and a second outer sleeve position;
   wherein the inner sleeve and the outer sleeve interact against each other at a driving interface such that the sleeve biasing member biasing the inner sleeve further biases the outer sleeve toward the first outer sleeve position, and movement of the outer sleeve from the first outer sleeve position toward the second outer sleeve position moves the inner sleeve from the first inner sleeve position toward the second inner sleeve position; and
   in a fully connected state of the first and second coupler components, the inner sleeve interacts directly against the first and second locking members to maintain the first and second locking members in a locked position, and the outer sleeve is laterally spaced apart from the first and second locking members.

2. The coupler assembly of claim 1, wherein the first coupler component comprises a first component body that includes a shoulder located on an outer surface of the first component body, and during a connection operation to connect the first and second coupler components, the shoulder firstly contacts the first locking member and drives the first locking member laterally outward within the first restriction slot.

3. The coupler assembly of claim 2, wherein the inner sleeve includes a sloped driving surface, and lateral outward movement of the first locking member interacts against the sloped driving surface to drive the inner sleeve axially from the first inner sleeve position toward the second inner sleeve position.

4. The coupler assembly of claim 3, wherein during the connection operation, the shoulder secondly contacts the second locking member and drives the second locking member laterally outward within the second restriction slot.

5. The coupler assembly of claim 4, wherein the lateral outward movement of the second locking member interacts against the sloped driving surface of the inner sleeve to drive the inner sleeve further toward the second inner sleeve position.

6. The coupler assembly of claim 2, wherein the first component body defines a locking slot that is located axially outward relative to the shoulder, and in the fully connected state of the first and second coupler components, the second locking member is positioned within the locking slot to prevent separation of the first and second coupler components.

7. The coupler assembly of claim 6, wherein in the fully connected state, the sleeve biasing member maintains the inner sleeve in the first inner sleeve position to maintain the second locking member within the locking slot to prevent separation of the first and second coupler components.

8. The coupler assembly of claim 2, wherein the outer sleeve is configured such that movement of the outer sleeve during the connection operation does not affect connecting the first and second coupler components.

9. The coupler assembly of claim 1, wherein in a disconnection operation, the outer sleeve is moved axially away from the second locking member, and the outer sleeve drives the inner sleeve away from the second locking member via the driving interface.

10. The coupler assembly of claim 1, wherein the sleeve biasing member is a spring.

11. The coupler assembly of claim 1, wherein each of the first locking member and the second locking member comprises a row of locking balls.

12. The coupler assembly of claim 1, wherein the first coupler component is a male component and the second coupler component is a female component.

13. The coupler assembly of claim 12, wherein the female component includes a female-side spring that biases a female-side poppet toward a closed position, and the male component includes a male-side spring that biases a male-side poppet toward a closed position; and wherein during a connection operation to connect the male component and the female component, the female-side poppet interacts against an inner surface of the male component.

14. The coupler assembly of claim 13, wherein the female-side poppet includes a plunger, and during the connection operation to connect the male component and the female component, the male-side poppet interacts against the plunger to open a fluid passage through the coupler assembly.

* * * * *